United States Patent
Bhattacharya

(10) Patent No.: US 9,965,383 B2
(45) Date of Patent: May 8, 2018

(54) FILE SYSTEM INDIRECTION TECHNIQUE FOR DIRECTLY MANAGING SOLID STATE DEVICES

(71) Applicant: NetApp, Inc., Sunnyvale, CA (US)

(72) Inventor: Indranil Bhattacharya, Bangalore (IN)

(73) Assignee: NetApp, Inc., Sunnyvale, CA (US)

( * ) Notice: Subject to any disclaimer, the term of this patent is extended or adjusted under 35 U.S.C. 154(b) by 101 days.

(21) Appl. No.: 14/812,629

(22) Filed: Jul. 29, 2015

(65) Prior Publication Data

US 2016/0041904 A1    Feb. 11, 2016

(30) Foreign Application Priority Data

Aug. 5, 2014   (IN) .......................... 2212/DEL/2014

(51) Int. Cl.
| | |
|---|---|
| *G06F 12/06* | (2006.01) |
| *G06F 12/02* | (2006.01) |
| *G06F 17/30* | (2006.01) |
| *G06F 3/06* | (2006.01) |

(52) U.S. Cl.
CPC .... *G06F 12/0246* (2013.01); *G06F 17/30218* (2013.01); *G06F 12/02* (2013.01); *G06F 17/30* (2013.01)

(58) Field of Classification Search
CPC .................. G06F 12/02; G06F 17/30
See application file for complete search history.

(56) References Cited

U.S. PATENT DOCUMENTS

| | | | |
|---|---|---|---|
| 7,243,207 B1* | 7/2007 | Prakash ............ | G06F 17/30067 707/E17.01 |
| 7,409,494 B2 | 8/2008 | Edwards et al. | |
| 8,171,064 B2* | 5/2012 | Makkar ............... | H04L 67/1097 707/802 |
| 9,032,138 B2* | 5/2015 | Choi ....................... | G06F 12/02 711/103 |
| 2007/0168633 A1* | 7/2007 | English ............... | H04L 67/1097 711/165 |
| 2008/0077762 A1* | 3/2008 | Scott ..................... | G06F 3/0608 711/170 |
| 2008/0270706 A1* | 10/2008 | Fair ......................... | G06F 3/061 711/137 |

(Continued)

Primary Examiner — Charles Rones
Assistant Examiner — Tian-Pong Chang
(74) Attorney, Agent, or Firm — Cesari and McKenna, LLP

(57) ABSTRACT

A technique uses file system indirection to manage solid state devices (SSDs). Based on relocation of data on the SSDs from a first SSD storage block to a second SSD storage block, a flash translation layer (FTL) driver may update a per-volume indirection file to reference the second SSD storage block and no longer reference the first SSD storage block. Based on a mismatch between the per-volume indirection file and a buffer tree, the buffer tree is updated to reference the second SSD storage block. Alternatively, the FTL driver may create and insert an entry into a mapping table, wherein the entry may reference the first SSD storage block and also reference the second SSD storage block. The buffer tree may then be updated to reference the second SSD storage block based on the new entry, and the new entry may then be deleted after the buffer tree is updated.

15 Claims, 6 Drawing Sheets

(56) References Cited

U.S. PATENT DOCUMENTS

2009/0310412 A1* 12/2009 Jang .................... G06F 12/0246
                                                          365/185.11
2012/0311228 A1* 12/2012 Hsu ..................... G06F 12/0246
                                                             711/102

* cited by examiner

| Shrinking Table | |
|---|---|
| Original Physical Location Identifier | New Physical Location Identifier |
| SSD Storage Block 200 | SSD Storage Block 300 |
| SSD Storage Block 300 | SSD Storage Block 400 |
| | |

FILE SYSTEM INDIRECTION TECHNIQUE FOR DIRECTLY MANAGING SOLID STATE DEVICES

CROSS-REFERENCE TO RELATED APPLICATIONS

The present application claims priority to Indian Provisional Patent Application Serial No. 2212/DEL/2014, which was filed on Aug. 5, 2014 and is hereby incorporated by reference.

BACKGROUND OF THE INVENTION

Field of the Invention

The subject matter herein relates to management of solid state devices and, more specifically, to a technique for using file system indirection to directly manage the devices.

Background Information

To improve the performance and longevity of solid state devices (SSDs), such as flash devices, of a storage array, a flash translation layer (FTL) driver of a storage system (i.e., Peripheral Component Interconnect Express (PCIe) flash) may be utilized to perform one or more functions, such as wear leveling, garbage collection, and write amplification. To perform such functions, the FTL driver may relocate data from an original SSD storage block on the array to a new SSD storage block. As data is relocated on the SSDs, the FTL driver typically updates a FTL data structure, such as a FTL mapping table, maintained in memory of the storage system to keep track of the relocation of the data. The FTL mapping table typically translates a logical address associated with the data (e.g., as provided by an indirection data structure managed by a file system of the storage system) to a physical address associated with the SSDs (e.g., as provided by the FTL driver). However, updating and maintaining multiple data structures, including the mapping table, in memory with logical and physical addresses is costly in terms of computer resources (e.g., consumption of memory and translation processing).

OVERVIEW

The subject matter herein is directed to a technique for using file system indirection to directly manage solid state devices (SSDs), such as flash devices, in a storage system. According to the technique and based on relocation of data on the SSDs, one or more data structures resident in memory of the storage system and utilized for file system indirection are updated or eliminated such that the data structures reference physical addresses (e.g., storage blocks) of the data on SSDs, thus obviating references to logical addresses provided by a file system of the storage system. In an embodiment, when data of a storage container, such as a file, is relocated from a first SSD storage block to a second SSD storage block, a flash translation layer (FTL) driver of the storage system may directly update a per-volume indirection data structure (e.g., a container file) managed by the file system to reference the second SSD storage block and no longer reference the first SSD storage block, thus obviating use of a FTL data structure (e.g., a FTL mapping table that translates a logical address to a physical address of the SSDs). A scanner of the file system may then compare the contents of the container file to a buffer tree of the file and, based on a mismatch, update the buffer tree to reference the second SSD storage block and no longer reference the first SSD storage block. In subsequent relocations, such as from the second SSD storage block to a third SSD storage block, the container file and buffer tree are updated to reference the third SSD storage block. Notably, the technique improves the efficiency and cost of file system indirection by eliminating a data structure (i.e., the FTL mapping table) in memory, as well as any translation processing i.e., translation of a logical address to a physical address of the SSDs, and maintenance.

In an alternate embodiment and based on relocating the data from the first SSD storage block to the second SSD storage block, the FTL driver may utilize a mapping table having one or more entries, wherein the entry includes an original physical location identifier portion that may reference the first SSD storage block and a new physical location identifier portion that may reference the second SSD storage block. The scanner may update the buffer tree, based on the entry in the mapping table (i.e., based on a mismatch between the buffer tree and the mapping table), to reference the second SSD storage block and no longer reference the first SSD storage block. The scanner may then delete the entry from the mapping table after the buffer tree is updated, thereby reducing (shrinking) the size of the mapping table (i.e., the shrinking table). In subsequent relocations, for example from the second SSD storage block to the third storage SSD block, a new entry is created and inserted in the shrinking table, wherein the original location identifier portion may reference the second SSD storage block and the new physical location identifier portion may reference the third SSD storage block. The scanner may update the buffer tree to reference the third SSD storage block and delete the entry from the shrinking table. The technique thus improves the efficiency and cost of file system indirection by reducing consumption of resources (e.g., memory) needed to store the shrinking table, as well as any processing and maintenance associated with a large, non-shrinking table (e.g., a FTL mapping table that translates a logical address to a physical address of the SSDs).

Advantageously, data on the SSD storage blocks may be accessed without the FTL driver having to update and utilize a large non-shrinking FTL mapping table that translates logical addresses to SSD storage blocks. Instead, the data can be directly accessed utilizing data structures (e.g., buffer tree and/or the container file) that are updated to directly reference the SSD storage blocks.

BRIEF DESCRIPTION OF THE DRAWINGS

The above and further advantages of the subject matter herein may be better understood by referring to the following description in conjunction with the accompanying drawings in which like reference numerals indicate identically or functionally similar elements, of which:

FIG. 3 is a schematic block diagram of a shrinking table;

DESCRIPTION

Figure 1:
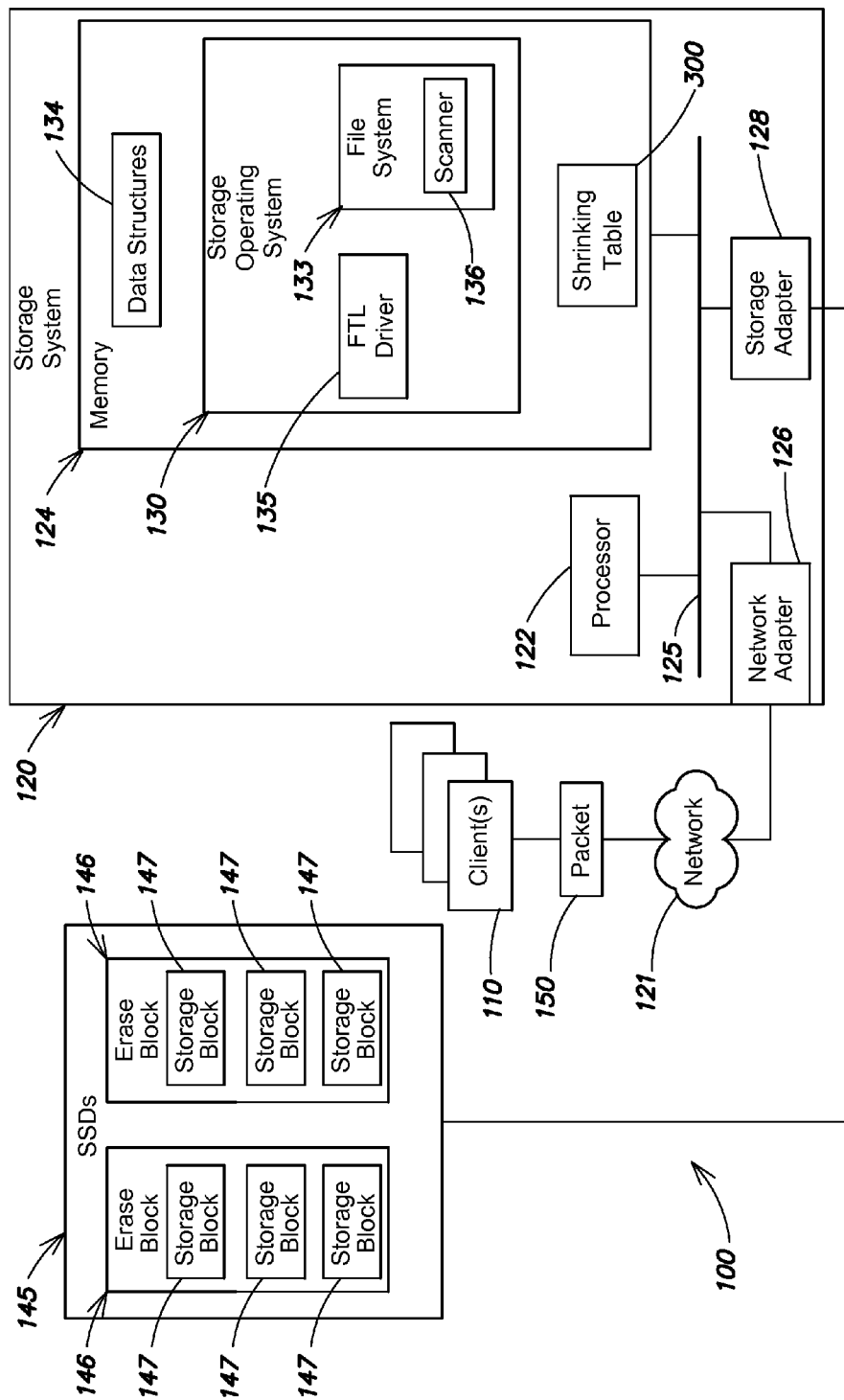
FIG. 1 is a schematic block diagram of a storage system environment.

FIG. 1 is a schematic block diagram of a storage system environment 100 that may be advantageously used with the subject matter described herein. The storage system environment 100 includes a storage system 120, coupled to one or more storage devices, such as solid state devices (SSDs) 145 and interconnected with one or more clients 110 by a network 121. The storage system 120 may be configured to operate as part of a client/server arrangement, as will be understood by those skilled in the art, to provide storage services to the one or more clients 110.

The SSDs 145 may include a plurality of block-oriented devices, such as flash devices. Typically, the SSDs are organized as erase blocks 146 that include a plurality of SSD storage blocks 147. The SSD storage blocks 147 may be of any size, for example, 4K SSD storage blocks, 16K SSD storage blocks etc., that are defined by an algorithm or an administrator. In addition, each SSD storage block 147 has its own physical block address or unique identifier. Although the SSDs are illustratively block-oriented flash devices, it will be understood to those skilled in the art that other block-oriented, non-volatile, SSDs with associated storage cells or components may be advantageously used with the subject matter described herein.

In operation, the storage system 120 services data access requests (e.g., read/write requests) issued by the client 110 over the network 121. Each client 110 may be a general-purpose computer configured to execute applications and interact with the storage system 120 in accordance with the client/server model of information delivery. That is, the client may request the services of the storage system 120, and the storage system may return the results of the services requested by the client 110, by exchanging packets 150 over the network 121. The clients may issue packets including file-based access protocols, such as the Common Internet File System (CIFS) protocol or Network File System (NFS) protocol, over TCP/IP when accessing information, such as data, in the form of data containers, such as files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of data containers, such as logical units (luns).

Illustratively, the storage system 120 includes a processor 122, a memory 124, a network adapter 126 and a storage adapter 128 interconnected by a system bus 125. The network adapter 126 includes the mechanical, electrical and signaling circuitry needed to connect the storage system 120 to the client 110 over the computer network 121, which may include a point-to-point connection or a shared medium, such as a local area network. Illustratively, the computer network 121 may be embodied as an Ethernet network or a Fibre Channel (FC) network.

The storage adapter 128 cooperates with the storage operating system 130 executing on the storage system 120 to access information stored on the SSDs 145 and requested by a user (or client). The storage adapter includes input/output (I/O) interface circuitry that couples to the SSDs 145 over an I/O interconnect arrangement, such as a conventional high-performance, FC serial link topology.

The memory 124 (e.g., DRAM) includes storage locations that are addressable by the processor and adapters for storing software program code. The processor and adapters may, in turn, include processing elements and/or logic circuitry configured to execute the software code and manipulate one or more data structures. The storage system 120 also includes a storage operating system 130 that illustratively implements a high-level module, such as a file system 133, to logically organize the information as a hierarchical structure of named storage containers, such as volumes, directories, files, and special types of files called virtual disks (or luns). The file system 133 maintains one or more data structures 134 (e.g., a buffer tree and a container file), stored in memory 124, to perform a variety of functions associated with the subject matter described herein. For example, the data structures may be utilized to translate (e.g., via file system indirection) an initial identifier (e.g., file block number (fbn)) to a physical location associated with the SSDs (e.g., an SSD storage block), as described in further detail below. In addition, the data structures may be updated according to the subject matter described herein.

Illustratively, the FTL driver 135 may perform one or more functions, such as wear leveling, garbage collection, and write amplification, to improve performance and longevity of the SSDs. To perform such functions, the FTL driver 135 may relocate data from an original location on the SSD (a first SSD storage block) to a new location on the SSDs (a second SSD storage block), as known by those skilled in the art. Further, the FTL driver 135 may update particular data structures, e.g., shrinking table 300 and/or per-volume indirection file (container file 204), based on relocation of the data, as described in further detail below.

In addition, scanner 136 of file system 133 may be utilized to compare the content (e.g., data) stored in the data structures 134 (e.g., buffer tree and container file) and shrinking table 300 to determine any differences and, based on the differences, update the data structures 134 and shrinking table 300 appropriately, as described in further detail below. The scanner 136 may execute on a schedule or may be initiated by, for example, an administrator. Alternatively, the scanner may execute each time a read request is directed to a relocated SSD block.

Figure 2A:
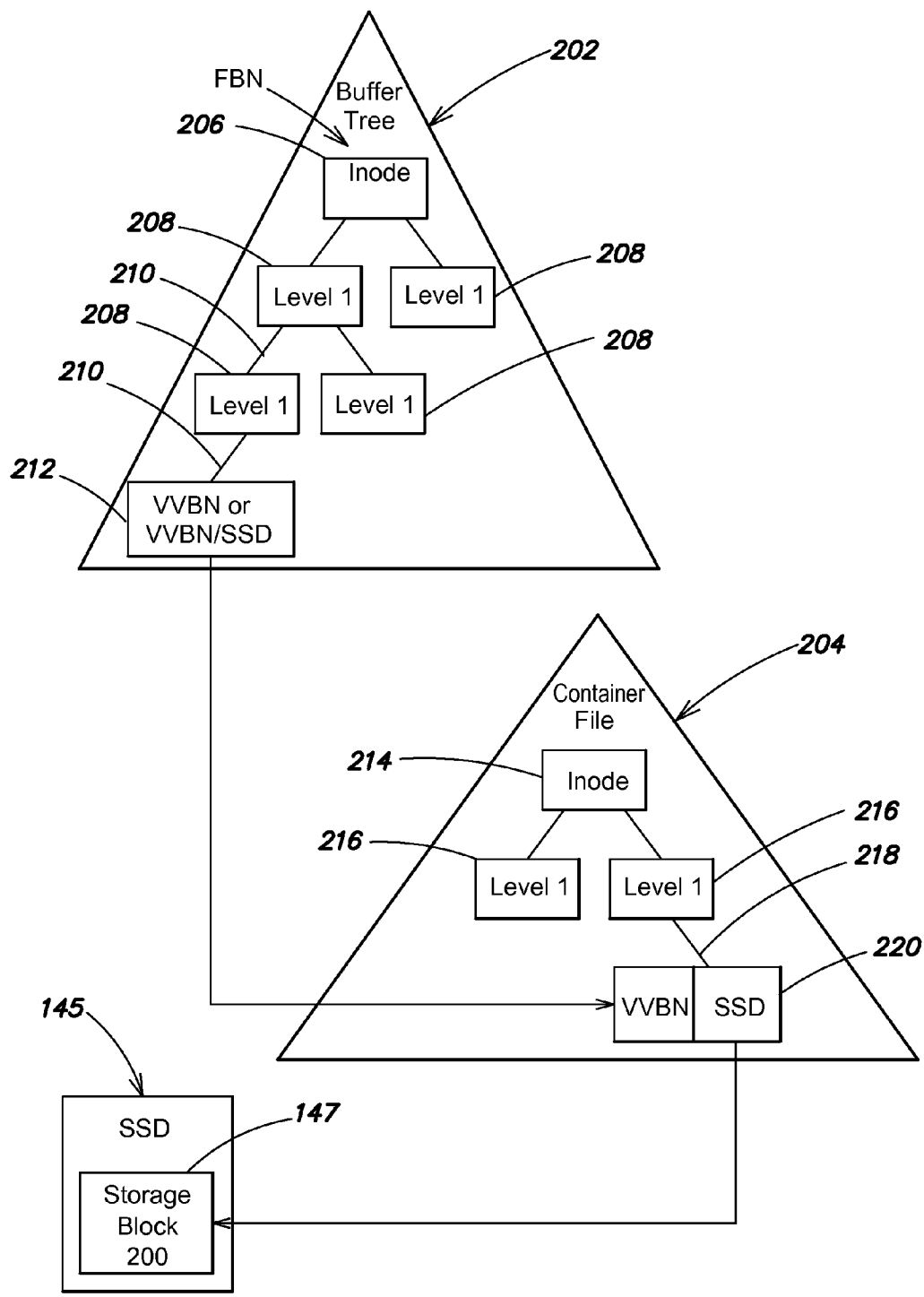
FIGS. 2A and 2B are schematic block diagrams for translating a logical address to a physical address according to the subject matter described herein.

FIG. 2A is a schematic block diagram for translating an initial identifier to a physical address of the SSDs (e.g., a SSD storage block) in an environment with a file system that utilizes virtual volumes (vvols). As known by those skilled in the art, vvols provide for the flexibility to create volumes on the SSDs by carving out arbitrary sized logical chunks of storage space of the SSDs. The environment as depicted in FIG. 2A includes the data structures configured to perform the translation by the file system 133 wherein the system 133 utilizes vvols. Specifically, the file system 133 maintains a buffer tree 202 for a file and a container file 204 for a vvol. The buffer tree 202 is an internal representation of blocks for the file. A root (top-level) inode 206, such as an embedded inode, references indirect (e.g., level 1) blocks 208. The indirect blocks (and inode) contain pointers 210 that ultimately reference a node 212 of the buffer tree 202 that stores a logical address, e.g., a virtual volume block number (vvbn) space identifier, associated with a vvol. For example, a client may issue a data access request to a file utilizing a file handle having an associated fbn (e.g., initial identifier). The processor 122 utilizes the fbn, and an inode associated with the file, to index into the buffer tree 202 (e.g., at a particular offset within the buffer tree) to ultimately reach the node 212 that stores a vvbn identifier (vvbn 5).

Once obtained from the buffer tree 202, the vvbn identifier is utilized by the file system 133 to index into the container file 204 for the vvol. Specifically, a container file 204 is maintained for each vvol where each vvol may be associated with a plurality of files. That is, vvbn identifiers of a plurality of buffer trees for a plurality of files may index into the container file 204 for the vvol. The container file 204 may also be embodied as a buffer tree and is essentially one large, sparse virtual disk containing all blocks owned by the vvol. The container file 204 includes an inode 214 and a plurality indirect blocks 216 and pointers 218 that ultimately reference a node 220 that stores a vvbn/SSD identifier pair. For example, the vvbn identifier (e.g., vvbn 5) is utilized to index into the container file 204 to ultimately reach node 220 that stores the vvbn/SSD pair of, e.g., vvbn 5/SSD 200. The SSD storage block identifier, i.e., SSD storage block 200, may then be utilized to, for example, execute a data access request issued by a client 110 for the data stored on SSD storage block 200.

It is noted that the node 212 of the buffer tree 202 may store the vvbn/SSD identifier pair instead of only storing the vvbn identifier to, in essence, bypass the translation by the container file 204. For example, node 212 may store the vvbn/SSD identifier pair of vvbn 5/SSD 200 instead of only storing vvbn 5. Virtual volumes, buffer trees and container files, as well as use of fbns, vvbns and file system indirection are described in commonly assigned U.S. Pat. No. 7,409,494 titled Extension of Write Anywhere File System Layout, by John K. Edwards et al., the contents of which are hereby incorporated by reference.

Figure 2B:
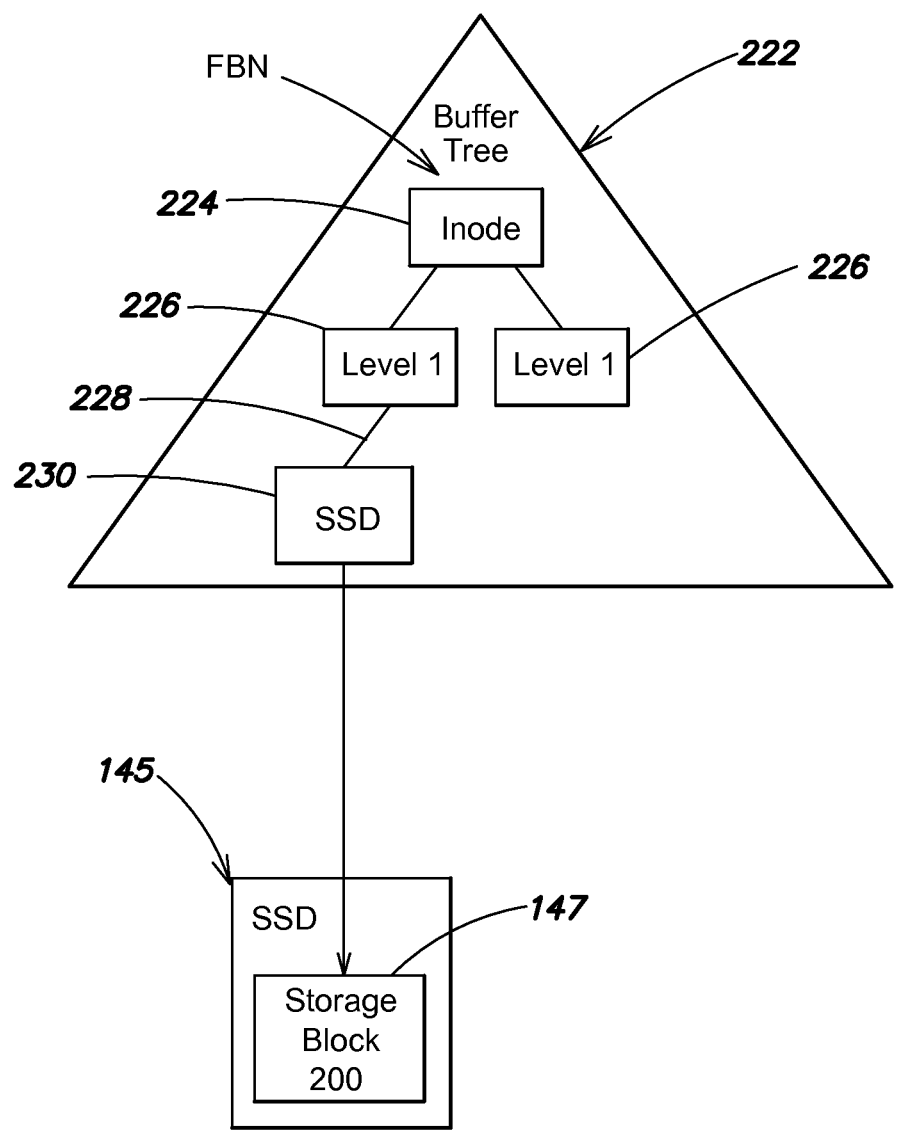

FIG. 2B is a schematic block diagram for translating an initial identifier to a physical address of the SSDs (e.g., a SSD storage block) in an environment with a file system that does not utilize vvols. Similar to FIG. 2A, an fbn is utilized to index into a buffer tree 222 for a file. The buffer tree 222 includes a root (top-level) inode 224, such as an embedded inode, that references indirect (e.g., level 1) blocks 226. The indirect blocks (and inode) contain pointers 228 that ultimately reference a node 230 of the buffer tree 222 that stores a SSD identifier associated with, for example, a SSD storage block. For example, a client may issue a data access request to a file utilizing a file handle that has an associated fbn (e.g., initial identifier). The processor 122 utilizes the fbn and an inode associated with the file to index into the buffer tree 222 (e.g., at a particular offset within the buffer tree) to ultimately reach the node 230 that stores SSD 200. The SSD storage block identifier (i.e., SSD storage block 200) may then be utilized to, for example, to execute a data access request issued by a client for the data stored on SSD storage block 200.

FIG. 3 is an illustration of a shrinking table that may be utilized with the subject matter described herein. The shrinking table 300 is illustratively maintained in memory 124 and may be utilized in an environment with a file system that does not utilize vvols. The shrinking table 300 may include a plurality of entries 302, where each entry 302 includes an original physical location identifier portion 304 and a new physical location identifier portion 306. Specifically, when data of a file is relocated by the FTL driver 135 from a first SSD storage block to a second SSD storage block, a new entry may be created and inserted into the shrinking table 300. Thus, the original physical location identifier portion 304 of the entry 302 may store an identifier associated with the first SSD storage block and the new physical location identifier portion 306 may store an identifier of the second SSD storage block at which the data was relocated. For example, if data is first relocated from SSD storage block 200 to SSD storage block 300, the FTL driver 135 creates and inserts a new entry 302 in the shrinking table 300 that includes the original physical location identifier portion 304 that stores an identifier for SSD storage block 200 and the new physical location identifier portion 306 that stores an identifier for SSD storage block 300. When the data is subsequently relocated to a different SSD storage block, for example, from SSD storage block 300 to SSD storage block 400, an entry 302 is created and inserted into the shrinking table 300 wherein the original physical location identifier portion 304 stores an identifier for SSD storage block 300 and the new physical location identifier portion 306 stores an identifier for SSD storage block 400. Upon update of the buffer tree for the file, the scanner 136 may delete the entry from the shrinking table, as described herein.

Figure 4:
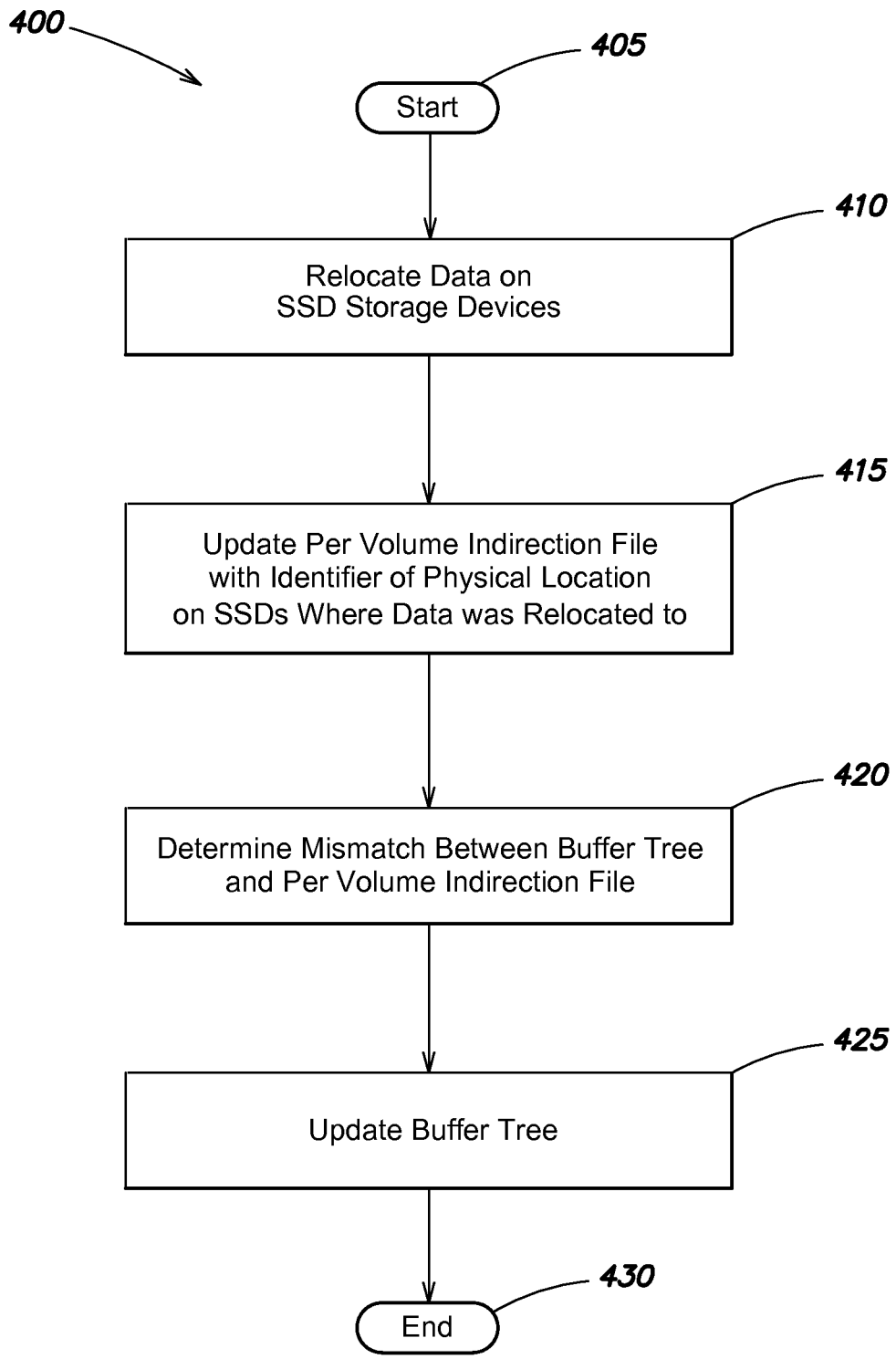
FIG. 4 is a flowchart detailing the steps of a procedure for using file system indirection to manage SSDs according to the subject matter described herein.

FIG. 4 is a flowchart detailing the steps of a procedure 400 for using file system indirection to manage SSDs in an environment utilizing virtual volumes. The procedure 400 starts at step 405 and continues to step 410, where data of a file is relocated on the SSDs from a first physical address on the SSDs (e.g., a first SSD storage block) to a second physical address on the SSDs (e.g., a second SSD storage block). Specifically, the FTL driver 135 may relocate the data on the SSDs for one or more reasons, such as, but not limited to, wear leveling, garbage collection, and/or write amplification. For example, the FTL driver 135 may relocate data on the SSDs from SSD storage block 200 to SSD storage block 300. The procedure continues to step 415 where the per volume indirection file (e.g., container file 204) is updated with the identifier of the physical location on SSDs at which the data was relocated. For example, and prior to relocation, the container file 304 has a vvbn/SSD pair of vvbn 5/SSD 200. After relocation of the data, the container file 304 is updated by the FTL driver 135 to reference SSD storage block 300 and no longer reference SD storage block 200. Illustratively, the node 220 of the container file 204 is updated to store a vvbn/SSD storage block pair of vvbn 5/SSD storage block 300. In addition, if the data is relocated again to a different SSD storage block, such as SSD storage block 400, the container file 204 may be updated again to reference SSD storage block 400 and no longer reference SSD storage block 300. For example, the FTL driver 135 updates node 220 of the container file 204 such that the vvbn/SSD storage block pair is vvbn 5/SSD 400.

At step 420, the scanner 136 of the file system 133 determines that there is a mismatch between the container file 204 and the buffer tree 202 of the file. In the case where the buffer tree references the vvbn/SSD identifier pair, the container file stores vvbn 5/SSD storage block 300, while the buffer tree stores a vvbn/SSD pair of vvbn 5/SSD 200. At step 425, the scanner 136 updates the buffer tree 202, and specifically the vvbn/SSD pair, based on the updated container file 204, such that the buffer tree 202 stores vvbn 5/SSD 300. Specifically, the scanner 136 updates node 212 of the buffer tree 202 to store vvbn 5/SSD 300. If the data is then relocated again from SSD block 300 to SSD block 400, as described above, the buffer tree 302 is also updated by the scanner 136 such that the vvbn/SSD pair is updated to vvbn 5/SSD 400. It is noted that the scanner 136 may execute when a read request is directed to a relocated SSD storage block. As such, the data stored the SSDs can be accessed utilizing the data structures (e.g., the buffer tree and the container file) and without utilizing an FTL mapping table and/or the FTL driver to translate a logical address to a physical address, since the data structures reference the physical address. At step 430, the procedure ends.

Figure 5:
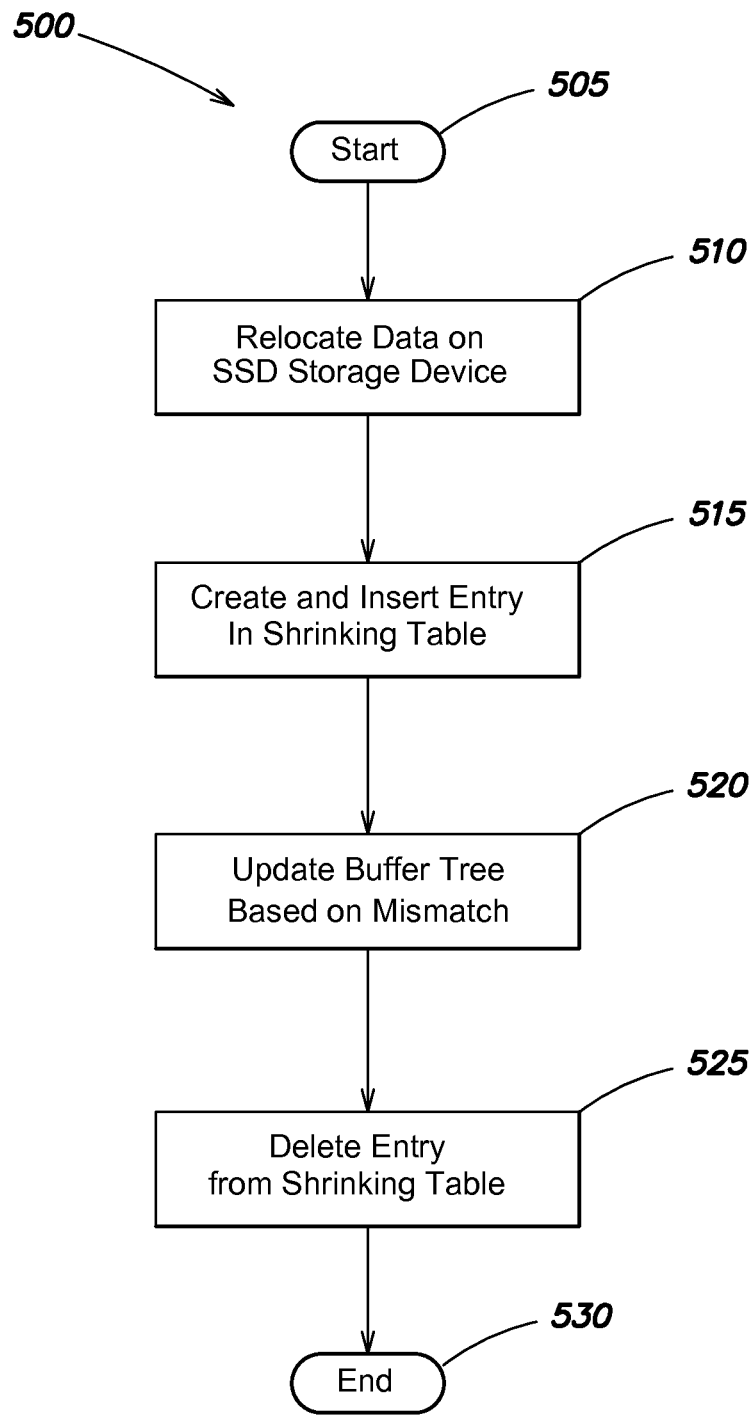
FIG. 5 is a flowchart detailing the steps of a procedure for using file system indirection to manage SSDs according to the subject matter described herein.

FIG. 5 is a flowchart detailing the steps of a procedure 500 for using file system indirection to manage SSDs in an environment that does not utilize virtual volumes. The procedure 500 starts at step 505 and continues to step 510, where data of a file is relocated on the SSDs from a first physical address on the SSDs (e.g., a first SSD storage block) to a second physical address on the SSDs (e.g., a second SSD storage block). Specifically, The FTL driver 135 may relocate the data on the SSDs for one or more reasons, such as, but not limited to, wear leveling, garbage collection, and/or write amplification. For example, the FTL driver 135 may relocate data on the SSDs from SSD storage block 200 to SSD storage block 300. At step 515, an entry is created and inserted into a mapping table (e.g., the shrinking table 300) based on relocating the data from SSD storage block 200 to SSD storage block 300. Specifically, the shrinking table entry 302 may include an original physical location identifier portion 304 and a new physical location identifier portion 306. For example, the original physical location identifier portion 304 may store an identifier of SSD storage block 200 and the new physical location identifier portion 306 may store an identifier of SSD storage block 300 at which the data was relocated. If the data is then relocated again, for example from SSD storage block 300 to SSD storage block 400, the shrinking table may be updated to store an entry 302 that may include an identifier of SSD storage block 300 stored in the original physical location identifier portion 304 and an identifier of SSD storage block 400 stored in the new physical location identifier portion 306.

At step 520, the buffer tree 202 of the file is updated based on the new entry in the shrinking table 300. Illustratively, and based on a mismatch between the buffer tree and the shrinking table (e.g., the buffer tree referencing SSD storage block 200 and the shrinking table 300 including the new entry), the scanner 136 updates the buffer tree to reference the SSD storage block that the data was relocated to (e.g., SSD storage block 300). For example, node 230 is updated to reference SSD storage block 300 and no longer reference SSD storage block 200. If, as described above, the data has been relocated again to SSD storage block 400 and the new entry has been created and inserted in the shrinking table, the buffer tree 202 is updated to store an identifier of SSD storage block 400 and no longer reference SSD storage block 300. It is noted that the scanner 136 may execute when a read request is directed to a relocated SSD storage block. At step 525, the entry 302 is deleted from the shrinking table 300 after the buffer tree 202 has been updated. Thus, the shrinking table 300 is "shrinking" since entries are deleted after the buffer tree 202 is updated. As such, the data stored the SSDs can be accessed utilizing the data structure (e.g., the buffer tree) without utilizing a full FTL mapping table and/or the FTL driver to translate a logical address to a physical address, since the data structure references the physical address. At step 530, the procedure ends.

The foregoing description has been directed to specific subject matter. It will be apparent, however, that other variations and modifications may be made to the described subject matter, with the attainment of some or all of its advantages. It is expressly contemplated that the procedures, processes, and methods described herein may be implemented in alternative orders. For example, although reference is made to buffer trees and container files, it is expressly contemplated that other named data structured, utilized for file system indirection and file system organization may be utilized with the subject matter described herein. Accordingly this description is to be taken only by way of example and not to otherwise limit the scope of the subject matter described herein. Therefore, it is the object of the appended claims to cover all such variations and modifications as come within the true spirit and scope of the subject matter.

What is claimed is:

1. A system comprising:
    a processor; and
    a memory coupled to the processor and coupled to one or more solid state devices (SSDs), the memory configured to store a flash translation layer (FTL) driver and a file system, the FTL driver and file system configured to:
        maintain a buffer tree of a file in the memory, the buffer tree having a block address referencing a first physical address on the SSDs, the block address included in a data structure stored in the memory;
        relocate data of the file from the first physical address on the SSDs to a second physical address on the SSDs;
        update the data structure to reference the second physical address on the SSDs;
        update the block address of the buffer tree of the file to reference the second physical address and remove reference to the first physical address in response to a mismatch between the buffer tree and the data structure; and
        in response to updating the block address of the buffer tree, remove the reference to the second physical address from the data structure to thereby shrink a memory usage of the data structure in the memory.

2. The system of claim 1, wherein the data structure is a mapping table that stores an entry that includes an original physical location identifier portion and a new physical location identifier portion, wherein the original physical location identifier portion stores a first identifier of the first physical address and the new physical location identifier portion stores a second identifier of the second physical address.

3. The system of claim 2, wherein the FTL driver and the file system configured to remove the reference to the second physical address from the data structure is further configured to:
    delete the entry from the mapping table to thereby providing a shrinking table.

4. The system of claim 1, wherein the FTL driver and the file system are further configured to:
    relocate the data of the file from the second physical address on the SSDs to a third physical address on the SSDs;
    update the data structure to reference the third physical address without referencing the second physical address; and
    update the buffer tree of the file to reference the third physical address and remove reference to the second physical address in response to the mismatch between the buffer tree and the data structure.

5. The system of claim 1, wherein a scanner of the file system is utilized to compare contents of the data structure to the buffer tree of the file to determine the mismatch.

6. The system of claim 5, wherein the mismatch is determined based on the data structure referencing the second physical address and the buffer tree referencing the first physical address.

7. The system of claim 1, wherein the FTL driver relocates the data from the first physical address on the SSDs to the second physical address on the SSDs based on performing at least one of (i) wear leveling for the SSDs, (ii) garbage collection for the SSDs, and (iii) write amplification for the SSDs.

8. A method comprising:
    maintaining a buffer tree of a file in a memory of a computer coupled to one or more solid state drives (SSDs), the buffer tree having a block address referencing a first physical address on the SSDs, the block address included in a data structure stored in the memory;

relocating, by a driver executing on the computer, data of the file from the first physical address on the SSDs to a second physical address on the SSDs;

updating, by the driver, the data structure such that the data structure references the second physical address on the SSDs;

updating, by a file system executing on the computer, the block address of the buffer tree of the file to include reference to the second physical address and remove reference to the first physical address in response to a mismatch between the buffer tree and the data structure; and in response to updating the block address of the buffer tree, removing reference to the second physical address from the data structure to thereby shrink a memory usage of the data structure in the memory.

9. The method of claim 8, wherein the data structure is a mapping table that stores an entry that includes an original physical location portion identifier and a new physical location identifier portion, wherein the original physical location identifier portion stores a first identifier of the first physical address and the new physical location identifier portion stores a second identifier of the second physical address.

10. The method of claim 9, further comprising:
deleting the entry from the mapping table after updating the buffer tree.

11. The method of claim 8, further comprising:
relocating, by the driver, the data of the file from the second physical address on the one or more SSDs to a third physical address on the one or more SSDs;

updating, by the driver, the data structure to reference the third physical address on the one or more SSDs; and updating, by the processor of the file system executing on the computer, the buffer tree of the file to reference the third physical address on the one or more SSDs and remove reference to the second physical address on the one or more SSDs based on a mismatch between the buffer tree and the data structure.

12. The method of claim 8, wherein the mismatch is determined based on the data structure referencing the second physical address on the one or more SSDs and the buffer tree referencing the first physical address on the one or more SSDs.

13. The method of claim 8, wherein the driver relocates the data from the first physical address on the one or more SSDs to the second physical address on the one or more SSDs based on performing at least one of wear leveling for the one or more SSDs, garbage collection for the one or more SSDs, and write amplification for the one or more SSDs.

14. A non-transitory computer readable storage medium storing executable program instructions configured to be executed by a processor coupled to a memory and coupled to one or more solid state drives (SSDs), the executable program instructions further configured to:

maintain a buffer tree of a file in the memory, the buffer tree having a block address referencing a first physical address on the SSDs, the block address included in a data structure stored in the memory;

relocate data of the file from the first physical address on the SSDs to a second physical address on the SSDs;

update the data structure such that the data structure references the second physical address on the SSDs;

update the block address of the buffer tree of the file to reference the second physical address and remove reference to the first physical address in response to a mismatch between the buffer tree and the data structure; and in response to updating the block address of the buffer tree of the file, update the data structure to remove reference to the second physical address to thereby shrink a memory usage of the data structure in the memory.

15. The non-transitory computer readable storage medium of claim 14, wherein the data structure is a mapping table that stores an entry that includes an original physical location identifier portion and a new physical location identifier portion, wherein the original physical location identifier portion stores a first identifier of the first physical address on the one or more SSDs and the new physical location identifier portion stores a second identifier of the second physical address on the one or more SSDs.

* * * * *